United States Patent [19]

Levin et al.

[11] Patent Number: 5,624,559
[45] Date of Patent: Apr. 29, 1997

[54] BAG FILTER AND RETAINER THEREFOR

[75] Inventors: Alan R. Levin, Somerville; Walter R. Booth, East Hanover, both of N.J.

[73] Assignee: H-Tech, Inc., Wilmington, Del.

[21] Appl. No.: 548,978

[22] Filed: Oct. 27, 1995

[51] Int. Cl.⁶ .................................................. B01D 29/13
[52] U.S. Cl. .......................... 210/447; 210/448; 210/452; 210/455; 210/456; 210/470
[58] Field of Search ................................ 210/447, 448, 210/452, 455, 456, 470

[56] References Cited

U.S. PATENT DOCUMENTS

| D. 361,823 | 8/1995 | Layton et al. . | |
|---|---|---|---|
| 2,081,968 | 6/1937 | Wicks et al. . | |
| 2,106,218 | 1/1938 | Krieck . | |
| 2,156,329 | 5/1939 | Beck . | |
| 2,298,674 | 10/1942 | Burhans . | |
| 2,982,413 | 5/1961 | Kraissl, Jr. . | |
| 3,122,501 | 2/1964 | Hultgren | 210/451 |
| 3,282,434 | 11/1966 | Pall | 210/451 |
| 3,931,015 | 1/1976 | Jenkins . | |
| 4,124,511 | 11/1978 | Lay | 210/447 |
| 4,253,959 | 3/1981 | Tafara . | |
| 4,356,791 | 11/1982 | Ward et al. . | |
| 4,419,240 | 12/1983 | Rosaen . | |
| 4,637,879 | 1/1987 | Hartley . | |
| 4,683,057 | 7/1987 | Krause et al. . | |
| 4,693,820 | 9/1987 | Baxter | 210/447 |
| 4,721,563 | 1/1988 | Rosaen . | |
| 4,935,134 | 6/1990 | Hensgen et al. | 210/447 |
| 5,514,275 | 5/1996 | Morgan, Jr. | 210/448 |

Primary Examiner—W. L. Walker
Attorney, Agent, or Firm—Selitto & Associates

[57] ABSTRACT

A fluid filter having a hollow, molded, plastic housing with an open end, a fluid inlet port and a fluid outlet. An internally threaded, plastic, molded cap is threadedly received on the housing via mating external threads for sealing the open end of the housing. A cap seal prevents fluid contamination of the threads. A removable filter element is contained within the housing between the fluid inlet and the fluid outlet. A molded, resilient, plastic retainer captured between the cap and the filter element retains the filter element in position within the filter. If the filter element is of a bag filter type, as compared with a filter cartridge type, the retainer has a plurality of resilient legs which press down upon a bag mouth seal forcing it into contact with a flared mouth of the bag support.

34 Claims, 4 Drawing Sheets

5,624,559

BAG FILTER AND RETAINER THEREFOR

FIELD OF THE INVENTION

The present invention relates to fluid filters, and more particularly to fluid filters employing a compliant fabric filter bag through which the fluid to be filtered is passed and which accumulates contaminants on a surface thereof.

BACKGROUND OF THE INVENTION

Bag-type filters are known in the art. Most are provided with a support of some type for the filter bag, e.g., a perforated metal basket. In addition to a bag support, some provision must be made for holding the filter bag in association with the bag support. In general, one can note that a variety of apparatus have been proposed for holding filter media in position within a filter housing. For example, in U.S. Pat. No. 2,081,968 to Wicks et al., a leaf spring acts against the upper portion of a filter cartridge to press the cartridge down into a seat at the bottom of the filter. In Krieck, U.S. Pat. No. 2,106,218, a spiral spring is used to retain a filter cartridge in position. In U.S. Pat. No. 2,156,329 to Beck, a wire frame extending down from the interior of the filter cover holds a filter cartridge in place. U.S. No. Pat. 4,721,563 to Rosaen discloses a filter having a cap portion which threads on to the base portion of a filter. In so doing, a peripheral seal ring extending from the upper peripheral edge of a filter cartridge is captured between the cap and an upper ledge in the base. A centrally located, concentric conduit protruding downward from the cap seals against the upper internal edge of a cylindrical cartridge which is urged upwards by a spring. In U.S. Pat. No. 4,419,240 to Rosaen, a filter element and optional liner are held in place by handles pressing against an upper cap. U.S. Pat. Nos. 3,931,015 to Jenkins and 4,253,959 to Tafara describe an apertured flange extending from a generally cylindrically shaped central member depending from a filter cap. The cap is threaded or clamped onto a body portion with the flange pressing against a seal ring for a bag filter. Tafara '959 utilizes plastic construction.

Notwithstanding the above-mentioned patents, it remains an objective in the industry and of the present invention to produce better bag filters more economically and reliably.

SUMMARY OF THE INVENTION

The problems and disadvantages associated with the conventional techniques and devices for filtering fluids are overcome by the present invention which includes a fluid filter having a hollow housing with an open end, a fluid inlet port and a fluid outlet. A cap is threadedly received on the housing for sealing the open end of the housing. A removable filter element is contained within the housing between the fluid inlet and the fluid outlet. A resilient retainer captured between the cap and the filter element retains the filter element in position within the filter.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
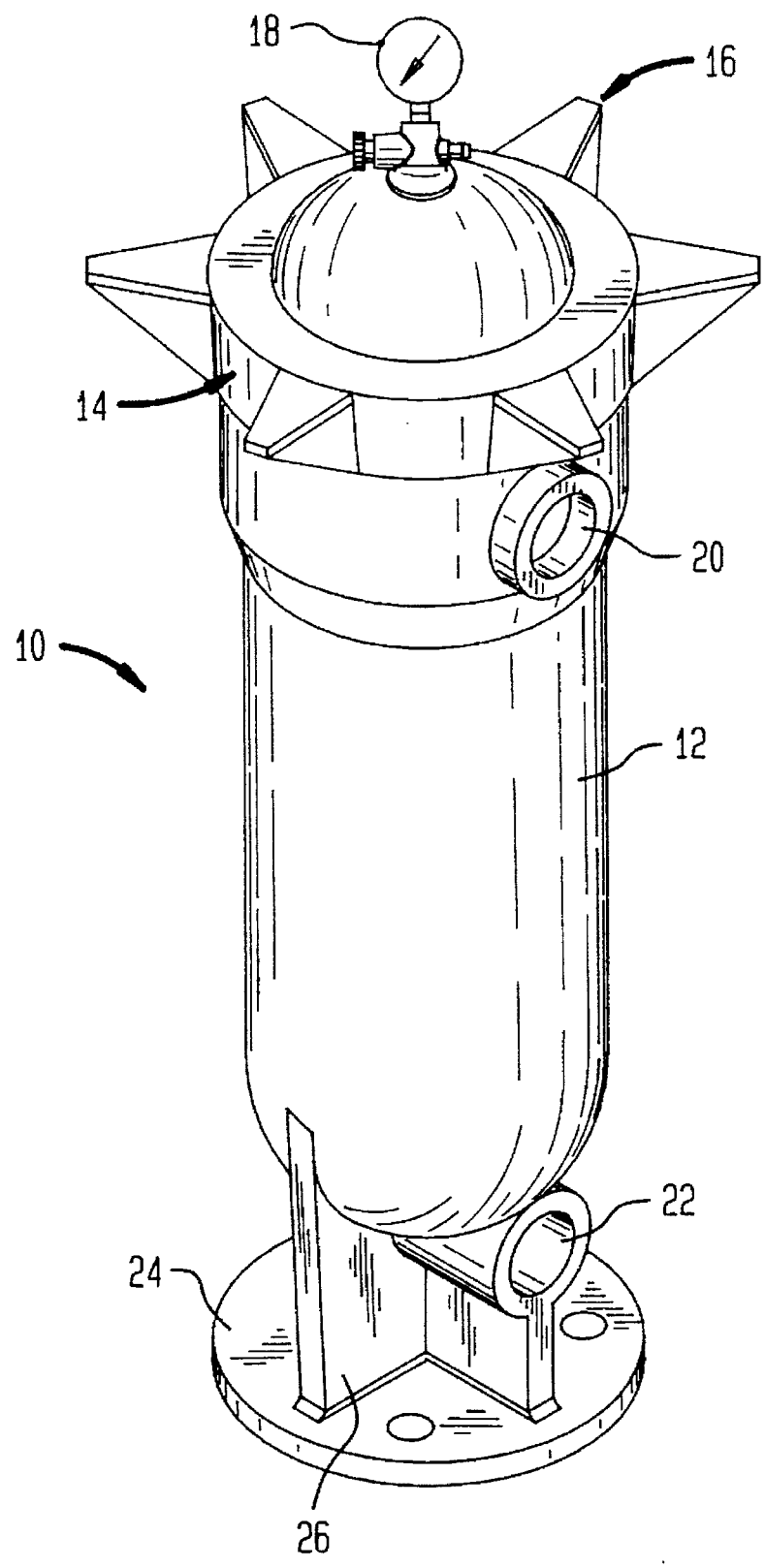
FIG. 1 is a perspective view of a filter in accordance with an exemplary embodiment of the present invention.

FIG. 1 shows a filter 10 for filtering fluids. The filter 10 has a lower body 12 and a cap portion 14 threadedly received thereon. The cap 14 has a plurality of integral handles 16 to facilitate installation and removal of the cap 14 from the body 12 by hand and without the use of tools. A conventional pressure gauge 18 is inserted into the cap to monitor internal pressure. An inlet 20 admits fluid into the filter and an outlet 22 carries filtered fluid to the system utilizing it, e.g., a swimming pool. An integral mounting flange 24 and strengthening ribs 26 provide a means for stably supporting and or securing the filter in position at the installation site.

Figure 2:
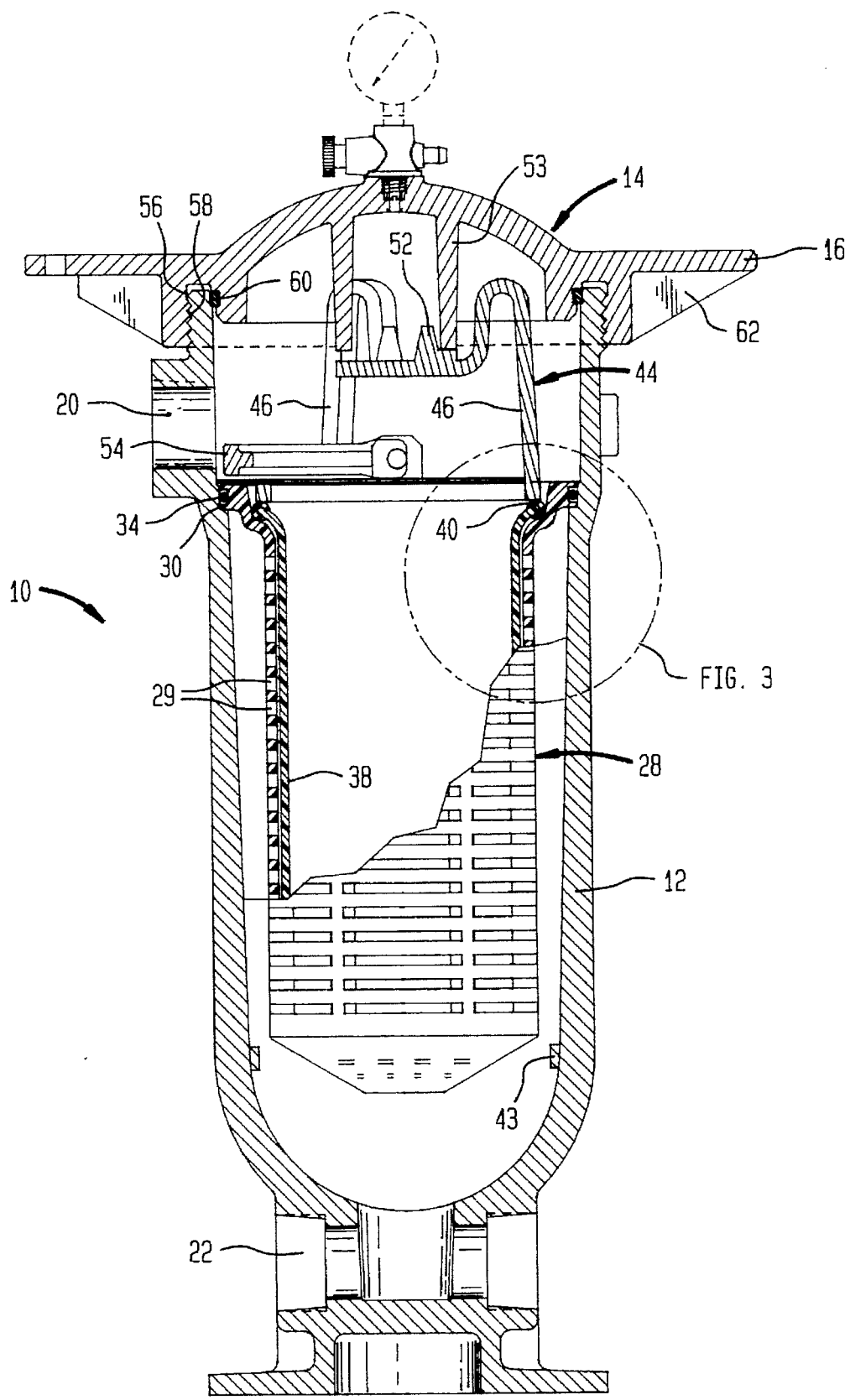
FIG. 2 is a longitudinal cross-sectional view of the filter shown in FIG. 1.
Figure 3:
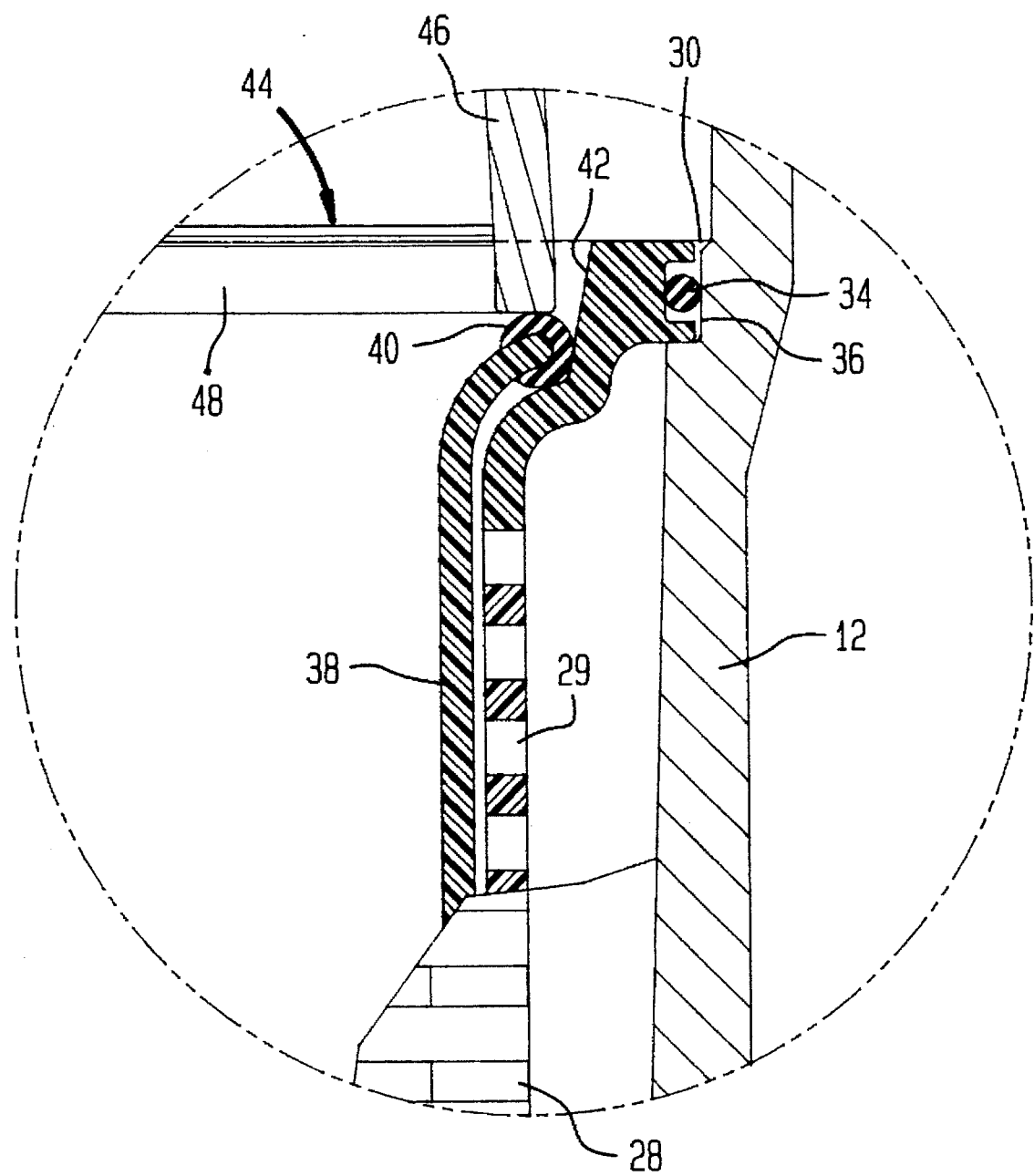
FIG. 3 is an enlarged scale view of the encircled portion of the filter shown in FIG. 2.

FIGS. 2 and 3 show the filter 10 in cross-section. A molded plastic filter basket 28 has a slotted flange 30 at the upper end. The slotted flange 30 accommodates an O-ring 34 for sealing against a mating seat 36 in the lower body 12 (see FIG. 3). The filter basket 28, which could also be made of perforated stainless steel or metal mesh, is perforated by a plurality of slots or apertures 29 to permit fluid to penetrate the basket 28. The basket 28 supports a filter bag 38 which is pressed against the interior of the basket 28 by fluid flow through the filter 10. The bag 38 may be fabricated from woven plastic fabric, spun polyethylene, or the like, as is known in the art. A plastic or metal sealing ring 40 is preferably included at the mouth of the filter bag to prevent unfiltered fluid from leaking between the filter bag 38 and the support basket 28 and out the filter outlet 22. The ring 40 may be affixed to the bag 38 by adhesive, integrally molded around the fabric of the mouth of the bag or, in the alternative, the bag material may envelope the ring and be sewn into position. As yet a further alternative, the bag material may be folded or rolled over itself to constitute a thickened mouth ring. In accordance with the present invention, the mouth 42 of the support basket is flared to accommodate a variety of filter bag types and brands having variously sized sealing rings 40. It can be appreciated that smaller rings will seat themselves in the flared basket mouth 42 lower than larger rings. Stops 43 are provided on the interior of the lower body 12 to facilitate the positioning of a cartridge type filter element in the body in lieu of a filter bag and bag retainer.

Figure 4:
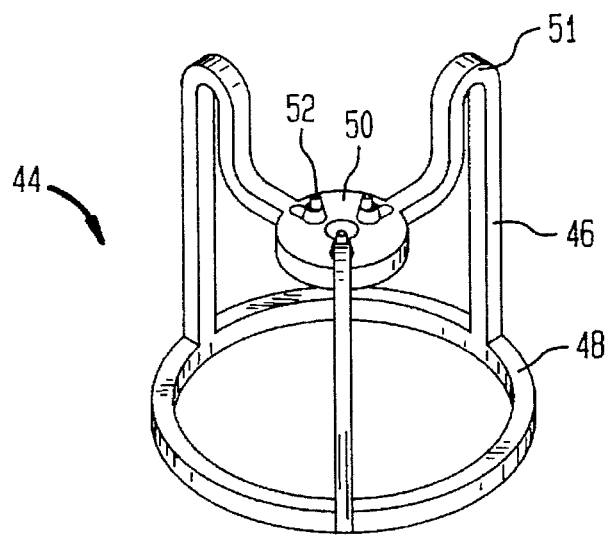
FIG. 4 is a perspective view of a filter bag retainer utilized in the filter of FIG. 2.

As shown in FIGS. 2, 3 and 4, the support basket 28 and filter bag 38 are both retained in position in the filter 10 by a retainer 44. The retainer 44 has a plurality of resilient legs 46 and may include a bottom ring 48 connecting the lower ends of the legs 46 (See FIG. 4). The legs 46 converge centrally into a depressed hub portion 50 of the retainer 44 and include an inverted "U" shaped curvature 51 which centralizes the retainer and provides resiliency. A plurality of nibs 52 space the retainer 44 away from the cap 14 to permit fluid flows therebetween and also to assist in registering the retainer 44 centrally relative to the cap 14. The cap 14 (see FIG. 2) has a centrally located extension 53, which may take the form of a cylinder, a plurality of legs or any other sturdy extension for engaging and pressing against the hub 50 and nibs 52 of the retainer 44.

To assemble the filter 10, the filter bag 38 and support basket 28 are placed in the filter. The retainer 44 then is placed on the bag sealing ring 40 with the bottom ring 48 of the retainer 44 engaging the sealing ring 40 in concentric fashion. The cap 14 is then placed on the body 12 and the threads of the cap 14 engaged to those provided on the upper outer edge of the body 12. As the cap 14 is threaded down on to the body 12, the extension 53 presses against the hub portion 50 and nibs 52 of the retainer 44, forcing the bottom ring 48 of the retainer 44 against the bag sealing ring 40, which is thereby pinched between the bottom ring 48 of the retainer 44 and the flared mouth 42 of the basket 28. This pinching action seals the mouth of the filter bag 38 against the mouth 42 of the basket 28. The sealing ring 40, if it is large enough, may seal on the side wall of the flared mouth 42 such that the ring 40 is not pushed all the way to the bottom of the mouth 42 as shown in FIG. 3. When the pressure on the retainer 44 exceeds a value as determined by the proportions, thickness and composition of the retainer 44, the legs 46 bend or deflect to allow the cover to be tightly installed on the body without distorting the ring 40 or basket mouth 42. The retainer 44 is preferably formed from an injection molded plastic such as polypropylene or polyvinylidene fluoride.

As shown in FIG. 2, the support basket 28 includes a handle 54 that pivots down to a retracted position when not in use. The threads on the cap and the body, 56 and 58, respectively, are protected from contamination by the fluid to be filtered or any debris therein by a cap sealing ring 60. This arrangement avoids the necessity of cleaning the threads upon assembly and disassembly.

Figure 5:
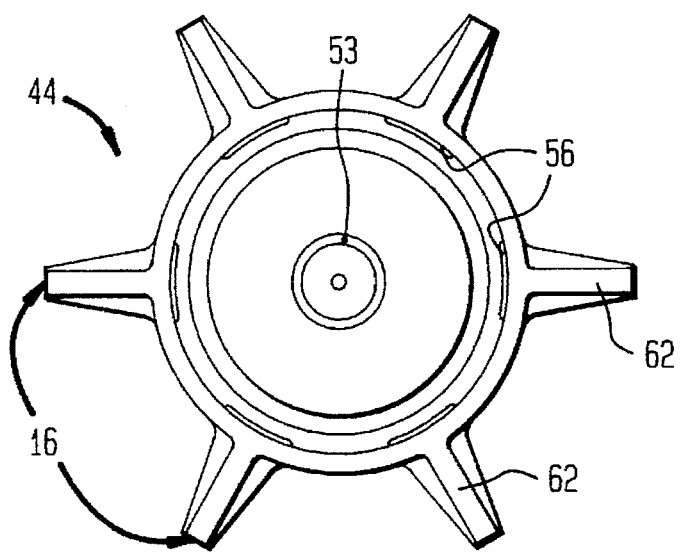
FIG. 5 is a bottom plan view of a cap utilized in the filter shown in FIGS. 1 and 2.

As can be appreciated from FIG. 5, the threads 56 on the cap 14 are discontinuous, covering approximately half of the internal periphery of the cap 14. The integrally formed handles 16 on the cap 14 are disposed adjacent a corresponding set of threads 56. Referring back to FIG. 2, it can be appreciated that reinforcing ribs 62 for the handles 16 support the threaded portions 56 of the cap 14 to prevent a deformation outwards that would result in disengagement or slipping of the threads under hydrostatic pressure, thus avoiding an unexpected and dangerous release of fluid under pressure.

In accordance with the present invention, the body portion 12 of the filter 10 is a one-piece plastic molding preferably made from glass reinforced polypropylene. The cap 14 is similarly fabricated in one piece from molded plastic. Other plastic materials can be employed in either a molding or casting process for forming the filter 10 as known in the art of plastics.

A filter in accordance with the present invention can be produced for high flow volumes of, e.g., 50 GPM and in double bag lengths of approximately 3 feet in length by 6 inch diameter. The all plastic construction prevents corrosion and contamination of filtrate through oxidation associated with metal filters. While light in weight, the filter of the present invention can withstand high pressures of, e.g., 225 psi.

It should be understood that the embodiments described herein are merely exemplary and that a person skilled in the art may make many variations and modifications without departing from the spirit and scope of the invention as defined in the appended claims. All such modifications and variations are intended to be included within the scope of the invention as defined in the appended claims.

We claim:

1. A filter for filtering fluids, comprising:
   a) a hollow having an open end, a fluid inlet and a fluid outlet;
   b) a cap removably received on said housing for sealing said open end thereof;
   c) a removable filter element contained within said housing between said fluid inlet and said fluid outlet; and
   d) a resilient retainer compressed between said cap and said filter element for retaining said filter element in position within said filter, said retainer including a hub positioned above said filter element such that said hub is movable toward said filter element in response to the application of said cap to said housing, a ring positioned in abutment with said filter element, and a plurality of resilient legs extending between said hub and ring, each of said legs being deformable in response to the movement of said hub toward said ring, whereby said legs inhibit said retainer from applying excess compressive forces against said filter element as said cap is applied to said housing.

2. The filer of claim 1, wherein each of said legs includes an inverted "U"-shaped portion proximate said hub to enhance the resiliency of said legs and to provide a depressed hub relative to the apex of said "U"-shaped portion.

3. The filter of claim 2, wherein said cap has substantially centrally located engaging means depending from said cap for engaging and pressing against said retainer and for urging said retainer into contact with said filter element, said retainer being self-centering.

4. The filter of claim 3, wherein said filter element is a bag filter and includes a bag support and a filter bag disposed within said bag support, said filter bag including a sealing ring at a mouth thereof for sealing against said bag support.

5. The filter of claim 4, wherein said ring of said retainer presses against said sealing ring of said filter bag to effect a seal against said bag support.

6. The filter of claim 5, wherein said bag support is generally cup-shaped, having a flared mouth opening, said flared mouth opening accommodating different sized sealing rings.

7. The filter of claim 6, wherein said ring of said retainer joins said plurality of legs together and provides an even annular surface to press against said sealing ring of said filter bag, pinching it between said flared mouth opening and said ring of said retainer.

8. The filter of claim 1, wherein said cap is threadedly received on said housing and includes a plurality of outwardly radiating handles to assist in threading said cap onto said housing.

9. The filter of claim 8, wherein said cap is manually removable from said housing without the use of tools.

10. The filter of claim 9, wherein said threads on said cap are positioned on an interior annular surface of said cap, said mating threads of said housing are positioned on an exterior, upper surface thereof and are isolated from contacting fluid passing through said filter by a sealing ring positioned between said cap and said housing.

11. The filter of claim 10, wherein said filter element is a bag filter.

12. The filter of claim 10, wherein said filter element is a cartridge filter.

13. The filter of claim 10, wherein said filter interchangeably receives a bag filter element and a cartridge filter element.

14. The filter of claim 8, wherein said cap has threads that are discontinuous along their length.

15. The filter of claim 14, wherein said handles are positioned proximate said threads and include a reinforcing rib to prevent said cap from expanding outwardly and slipping relative to mating threads on said housing.

16. A filter for filtering fluids, comprising:
   a) a hollow, molded, plastic housing having an open end, a fluid inlet and a fluid outlet;
   b) a molded plastic cap threadedly received on said housing for sealing said open end;

c) a removable filter element contained within said housing positioned between said fluid inlet and said fluid outlet; and d) a molded, resilient, plastic retainer compressed between said cap and said filter element for retaining said filter element in position within said filter, said retainer including a hub positioned above said filter such that said hub is movable toward said filter element in response to the application of said cap to said housing, a ring positioned in abutment with said filter element, and a plurality of resilient legs extending between said hub and said ring, each of said legs being deformable in response to the movement of said hub toward said ring, whereby said legs inhibit said retainer from applying excess compressive forces against said filter element as said cap is applied to said housing.

17. The filter of claim 16, wherein each of said legs includes an inverted "U"-shaped portion proximate said hub to enhance the resiliency of said legs and to provide a depressed hub relative to the apex of said "U"-shaped portion.

18. The filter of claim 17, wherein said cap has substantially centrally located engaging means depending from said cap for engaging and pressing against said retainer and for urging said retainer into contact with said filter element, said retainer being self-centering.

19. The filter of claim 18, wherein said filter element is a bag filter and includes a bag support and a filter bag disposed within said bag support, said filter bag including a sealing ring at a mouth thereof for sealing against said bag support.

20. The filter of claim 19, wherein said ring of said retainer presses against said sealing ring of said filter bag to effect a seal against said bag support.

21. The filter of claim 20, wherein said bag support is generally cup-shaped, having a flared mouth opening, said flared mouth opening accommodating different sized sealing rings.

22. The filter of claim 21, wherein said ring of said retainer joins said plurality of legs together and provides an even annular surface to press against said sealing ring of said filter bag, pinching it between said flared mouth opening and said ring of said retainer.

23. The filter of claim 16, wherein said cap includes a plurality of outwardly radiating handles to assist in threading said cap onto said housing.

24. The filter of claim 23, wherein said cap has threads that are discontinuous along their length.

25. The filter of claim 24, wherein said handles are positioned proximate said threads and include a reinforcing rib to prevent said cap from expanding outwardly and slipping relative to mating threads on said housing.

26. The filter of claim 16, further including an integral mounting flange disposed adjacent a lower end of said housing.

27. A filter for filtering fluids, comprising:

a) a hollow housing having an open end, a fluid inlet and a fluid outlet;

b) a cap removably received on said housing for sealing said open end thereof;

c) a removable filter element contained within said housing between said fluid inlet and said fluid outlet, said filter element being a bag filter and including a bag support and a filter bag, which is disposed within said bag support, said filter bag including a sealing ring at a mouth thereof for sealing against said bag support; and d) a resilient retainer captured between said cap and said filter element the retaining said filter element in position within said filter, said retainer having a plurality of resilient legs extending from a central hub, each of said legs including an inverted "U"-shaped portion proximate said hub to enhance the resiliency of said legs and to provide a depressed hub relative to the apex of said "U"-shaped portion, said cap having substantially centrally located engaging means, which depend from said cap, for engaging and pressing against said retainer and for urging said retainer into contact with said filter element, and said retainer being self-centering.

28. The filter of claim 27, wherein a lower portion of each of said legs presses against said sealing ring of said filter bag to effect a seal against said bag support.

29. The filter of claim 28, wherein said bag support is generally cup-shaped, having a flared mouth opening, said flared mouth opening accommodating different sized sealing rings.

30. The filter of claim 29, wherein said retainer includes a bottom ring joining said plurality of legs together and providing an even annular surface to press against said sealing ring, pinching it between said flared mouth opening and said bottom ring.

31. A filter for filtering fluids, comprising:

a) a hollow, molded, plastic housing having an open end, a fluid inlet and a fluid outlet;

b) a molded plastic cap threadedly received on said housing for sealing said open end;

c) a removable filter element contained within said housing positioned between said fluid inlet and said fluid outlet, said filter element being a bag filter and including a bag support and a filter bag, which is disposed within said bag support, said filter bag including a sealing ring at a mouth thereof for sealing against said bag support; and d) a molded, resilient, plastic retainer captured between said cap and said filter element for retaining said filter element in position within said filter, said retainer having a plurality of resilient legs extending from a central hub, each of said legs including an inverted "U"-shaped portion proximate said hub to enhance the resiliency of said legs and to provide a depressed hub relative to the apex of said "U"-shaped portion, said cap having substantially centrally located engaging means, which depend from said cap, for engaging and pressing against said retainer and for urging said retainer into contact with said filter element, and said retainer being self-centering.

32. The filter of claim 31, wherein a lower portion of each of said legs presses against said sealing ring of said filter bag to effect a seal against said bag support.

33. The filter of claim 32, wherein said bag support is generally cup-shaped, having a flared mouth opening, said flared mouth opening accommodating different sized sealing rings.

34. The filter of claim 33, wherein said retainer includes a bottom ring joining said plurality of legs together and providing an even annular surface to press against said sealing ring, pinching it between said flared mouth opening and said bottom ring.

* * * * *

UNITED STATES PATENT AND TRADEMARK OFFICE
CERTIFICATE OF CORRECTION

PATENT NO. : 5,624,559
DATED : April 29, 1997
INVENTOR(S) : Levin et al.

It is certified that error appears in the above-indentified patent and that said Letters Patent is hereby corrected as shown below:

Column 1, line 25, delete "No." and insert --Pat.--.
Column 1, line 26, delete "Pat." and insert --No.--.

Column 4, line 15, delete "filer" and insert --filter--.

Signed and Sealed this

Eighteenth Day of November 1997

Attest:

BRUCE LEHMAN

Attesting Officer

Commissioner of Patents and Trademarks